(12) United States Patent
Peterson et al.

(10) Patent No.: US 10,826,357 B2
(45) Date of Patent: Nov. 3, 2020

(54) HARMONIC SHUNTING ELECTRIC MOTOR WITH FACETED SHAFT FOR IMPROVED TORQUE TRANSMISSION

(71) Applicant: Trane International Inc., Davidson, NC (US)

(72) Inventors: Charles J. Peterson, LaCrosse, WI (US); Russell T. Abbott, Caledonia, MN (US)

(73) Assignee: Trane International Inc., Davidson, NC (US)

( * ) Notice: Subject to any disclaimer, the term of this patent is extended or adjusted under 35 U.S.C. 154(b) by 473 days.

(21) Appl. No.: 15/635,658

(22) Filed: Jun. 28, 2017

(65) Prior Publication Data

US 2019/0006916 A1   Jan. 3, 2019

(51) Int. Cl.
| | | |
|---|---|---|
| *H02K 11/01* | (2016.01) | |
| *H02K 9/20* | (2006.01) | |
| *H02K 1/27* | (2006.01) | |
| *H02K 1/28* | (2006.01) | |
| *F25B 31/00* | (2006.01) | |
| *H02K 21/16* | (2006.01) | |
| *H02K 1/22* | (2006.01) | |
| *H02K 16/02* | (2006.01) | |
| *H02K 9/22* | (2006.01) | |

(52) U.S. Cl.
CPC ........... *H02K 11/01* (2016.01); *F25B 31/006* (2013.01); *H02K 1/223* (2013.01); *H02K 1/278* (2013.01); *H02K 1/28* (2013.01); *H02K 9/20* (2013.01); *H02K 21/16* (2013.01); *H02K 9/22* (2013.01); *H02K 16/02* (2013.01)

(58) Field of Classification Search
CPC ....... F25B 31/006; H02K 11/01; H02K 16/02; H02K 1/223; H02K 1/278; H02K 1/28; H02K 21/16; H02K 9/20; H02K 9/22
See application file for complete search history.

(56) References Cited

U.S. PATENT DOCUMENTS

| | | |
|---|---|---|
| 2,458,010 A | 1/1949 | Ludwig |
| 4,556,809 A | 12/1985 | Beisse et al. |
| 4,638,233 A | 1/1987 | Erdman |
| 4,667,123 A | 5/1987 | Denk et al. |
| 4,741,094 A | 5/1988 | Denk et al. |
| 4,860,231 A | 8/1989 | Ballard et al. |
| 4,959,577 A | 9/1990 | Radomski |

(Continued)

*Primary Examiner* — Bernard Rojas
(74) *Attorney, Agent, or Firm* — The Salerno Law Firm, P.C.

(57) ABSTRACT

Disclosed are an electric motor and a simplified variable speed drive system which renders the use of filtering components in a motor drive circuit unnecessary and increases torque transfer from permanent magnets of the rotor to the output shaft. The motor includes a fluid gap between the rotor and the stator configured to receive a cooling fluid, such a refrigerant. A plurality of radially-abutting, bread loaf-shaped magnets having a flat base are respectively fixed to a plurality of longitudinally oriented mounting facets provided on the shaft to provide maximum torque transfer from the magnets to the shaft. An eddy shield disposed between the faceted shaft and the magnets thermally shunts high frequency harmonics from the magnets to the shaft and cooling fluid. The rotor components are mechanically secured by a sleeve disposed around the rotor.

24 Claims, 10 Drawing Sheets

(56) References Cited

U.S. PATENT DOCUMENTS

| | | | |
|---|---|---|---|
| 4,973,896 A | 11/1990 | Shiga et al. | |
| 5,086,266 A | 2/1992 | Shiga et al. | |
| 5,118,979 A * | 6/1992 | Shih | H02K 3/51 310/214 |
| 5,132,581 A | 7/1992 | Kusase | |
| 5,334,898 A | 8/1994 | Skybyk | |
| 5,364,304 A | 11/1994 | Hampton | |
| 5,376,877 A | 12/1994 | Kern et al. | |
| 5,397,975 A | 3/1995 | Syverson | |
| 5,502,368 A | 3/1996 | Syverson et al. | |
| 5,504,417 A | 4/1996 | Kern et al. | |
| 5,625,276 A | 4/1997 | Scott et al. | |
| 5,656,922 A | 8/1997 | LaVelle et al. | |
| 5,691,589 A * | 11/1997 | Keim | H02K 1/2786 29/596 |
| 5,694,889 A | 12/1997 | Ball et al. | |
| 5,710,471 A | 1/1998 | Syverson et al. | |
| 5,886,504 A | 3/1999 | Scott et al. | |
| 5,890,460 A | 4/1999 | Ball et al. | |
| 5,896,021 A | 4/1999 | Kumar | |
| 5,998,903 A | 12/1999 | Umeda et al. | |
| 6,133,659 A | 10/2000 | Rao | |
| 6,252,323 B1 * | 6/2001 | Nishikawa | H02K 1/278 310/112 |
| 6,318,066 B1 | 11/2001 | Skowronski | |
| 6,405,550 B1 | 6/2002 | Reason et al. | |
| 6,476,509 B1 | 11/2002 | Chen et al. | |
| 6,480,404 B2 | 11/2002 | Giraud et al. | |
| 6,657,348 B2 | 12/2003 | Qin et al. | |
| 6,685,447 B2 | 2/2004 | Mabe, Jr. et al. | |
| 6,777,846 B2 | 8/2004 | Feldner et al. | |
| 6,798,097 B2 | 9/2004 | Pullen et al. | |
| 6,899,538 B2 | 5/2005 | Matoba | |
| 6,906,443 B2 * | 6/2005 | Luo | H02K 1/278 310/156.47 |
| 7,122,923 B2 | 10/2006 | Lafontaine et al. | |
| 7,194,985 B2 | 3/2007 | Wachigai et al. | |
| 7,199,559 B2 | 4/2007 | Yanagi | |
| 7,207,187 B2 | 4/2007 | Funahashi et al. | |
| 7,327,123 B2 | 2/2008 | Faberman et al. | |
| 7,484,376 B2 | 2/2009 | Pham | |
| 7,574,873 B2 | 8/2009 | Goto et al. | |
| 7,615,896 B2 | 11/2009 | Alston et al. | |
| 7,743,616 B2 | 6/2010 | Renken et al. | |
| 7,768,165 B2 | 8/2010 | Scott et al. | |
| 7,768,166 B2 | 8/2010 | Lafontaine et al. | |
| 7,852,049 B2 | 12/2010 | Maddali et al. | |
| 7,863,787 B2 | 1/2011 | Lafontaine et al. | |
| 7,944,187 B2 | 5/2011 | Dooley | |
| 8,018,108 B2 | 9/2011 | Lafontaine et al. | |
| 8,093,772 B2 | 1/2012 | Scott et al. | |
| 8,148,866 B2 | 4/2012 | Shah | |
| 8,207,642 B2 | 6/2012 | Lafontaine et al. | |
| 8,258,641 B2 | 9/2012 | Fiset et al. | |
| 8,269,370 B2 | 9/2012 | Naga | |
| 8,276,396 B2 | 10/2012 | Siegenthaler et al. | |
| 8,305,048 B2 | 11/2012 | Matsui | |
| 8,393,169 B2 | 3/2013 | Pham | |
| 8,448,433 B2 | 5/2013 | McBride et al. | |
| 8,456,128 B2 | 6/2013 | Fotherby | |
| 8,476,872 B2 | 7/2013 | Truckenbrod et al. | |
| 8,550,370 B2 | 10/2013 | Barrett et al. | |
| 8,823,331 B2 | 9/2014 | Lovejoy | |
| 8,928,262 B2 | 1/2015 | Chretien | |
| 9,160,255 B2 | 10/2015 | Greetham | |
| 9,263,984 B2 | 2/2016 | Hatakeyama et al. | |
| 9,277,600 B2 | 3/2016 | Matsumoto et al. | |
| 9,353,738 B2 | 5/2016 | Ramayya | |
| 9,385,575 B2 | 7/2016 | Danforth, III et al. | |
| 9,680,351 B2 | 6/2017 | Boxberg et al. | |
| 9,831,746 B2 | 11/2017 | Maki-Ontto et al. | |
| 2003/0094867 A1 | 5/2003 | Wolters | |
| 2010/0012409 A1 | 1/2010 | Heidenreich et al. | |
| 2010/0013329 A1 | 1/2010 | Heidenreich et al. | |
| 2010/0045105 A1 | 2/2010 | Bovio et al. | |
| 2010/0083692 A1 * | 4/2010 | Todd | F25B 49/025 62/498 |
| 2011/0017529 A1 | 1/2011 | Durney | |
| 2011/0083450 A1 | 4/2011 | Turner et al. | |
| 2012/0316711 A1 | 12/2012 | Christian et al. | |
| 2013/0192216 A1 | 8/2013 | Berlin, Jr. et al. | |
| 2013/0201316 A1 | 8/2013 | Binder et al. | |
| 2013/0327285 A1 | 12/2013 | Burnham et al. | |
| 2014/0265745 A1 | 9/2014 | Maki-Ontto et al. | |
| 2015/0030490 A1 | 1/2015 | Beekman et al. | |
| 2016/0186603 A1 | 6/2016 | Robb et al. | |
| 2016/0190878 A1 | 6/2016 | Saari et al. | |
| 2016/0190883 A1 | 6/2016 | Maki-Ontto et al. | |
| 2016/0359394 A1 * | 12/2016 | Zheng | H02K 11/01 |
| 2017/0149296 A1 | 5/2017 | Vikman et al. | |
| 2019/0006916 A1 * | 1/2019 | Peterson | H02K 11/01 |

\* cited by examiner

HARMONIC SHUNTING ELECTRIC MOTOR WITH FACETED SHAFT FOR IMPROVED TORQUE TRANSMISSION

BACKGROUND

1. Technical Field

The present disclosure is directed to systems, apparatus, and methods for thermal management of electrical machines (e.g., compressor motors in chillers), and in particular, an improved variable speed electric motor and drive system that eliminates the need for drive current harmonic filters.

2. Background of Related Art

In AC electric motors, motor temperature rise results from the circulation of high frequency currents which do not contribute to magnetic flux production in the air gap, but rather dissipate in the motor stator and/or rotor as Joule loss. Existing methods to mitigate this issue include installation of passive filters (e.g., L, LC, etc.) between the motor and drive, use of multi-level inverters, pulse width modulation (PWM) optimization patterns and increasing switching frequencies. Each of these methods is costly, bulky, and can result on overall system derating (e.g., insulated gate bipolar transistor (IGBT) and associated power module de-rating at higher switching frequencies). Cost, loss, and rating of high speed motors and drive systems are significantly impacted by high frequency harmonics.

SUMMARY

A hermetic AC electric motor includes harmonics shunting such that high frequency harmonics can be shunted from the AC electric motor without the use of one or more filters. The motor can further include a stator and a rotor disposed within the stator and in selective magnetic communication with the stator. A fluid gap can exist between the rotor and the stator. The fluid gap can be configured to receive a cooling fluid. A cage can be disposed on the rotor configured to receive high frequency harmonics and shunt the high frequency harmonics to the cooling fluid.

The rotor can include surface permanent magnets and the cage includes a plurality of aluminum wedges, each wedge disposed between each surface permanent magnet. In certain embodiments, the cage can include one or more aluminum spacers disposed around the rotor. The one or more aluminum spacers can include a thick spacer and two thin spacers disposed axially away from the thick spacer on opposite sides of the thick spacer. The motor can further include a carbon fiber sleeve disposed around the rotor and the cage.

The motor can include a stator, and a rotor that includes a shaft, an eddy current shield disposed around the shaft, and a plurality of magnets disposed around the eddy current shield. The eddy current shield is configured to receive high frequency harmonics and to shunt the high frequency harmonics to the shaft, and to the cooling fluid. A sleeve, which can be made of carbon fiber, may be disposed around the rotor. The eddy current shield can be formed from copper.

In accordance with at least one aspect of the present disclosure, a system includes an AC electric source that outputs high frequency harmonics, and a hermetic AC electric motor connected to the AC electric source without one or more filters. The AC electric motor includes harmonics shunting such that the high frequency harmonics are shunted from the AC electric motor without the use of one or more filters.

The hermetic AC electric motor of the system can further include a stator and a rotor disposed within the stator and in selective magnetic communication with the stator. A fluid gap can exist between the rotor and the stator. The fluid gap can be configured to receive a cooling fluid. A cage can be disposed on the rotor configured to receive high frequency harmonics and shunt the high frequency harmonics to the cooling fluid.

The rotor can include a plurality of surface permanent magnets and the cage can include a plurality of aluminum wedges. Each wedge is disposed between two surface permanent magnets. In certain embodiments, the cage can include one or more aluminum spacers disposed around the rotor. The one or more aluminum spacers can include a thick spacer and two thin spacers disposed axially away from the thick spacer on opposite sides of the thick spacer. The motor can further include a carbon fiber sleeve disposed around the rotor and the cage.

The hermetic AC electric motor of the system can include a stator, and a rotor that includes a shaft, an eddy current shield disposed around the shaft, and a plurality of magnets disposed around the eddy current shield. The eddy current shield is configured to receive high frequency harmonics and to shunt the high frequency harmonics to the shaft, and to the cooling fluid. A sleeve, which can be made of carbon fiber, may be disposed around the rotor. The eddy current shield can be formed from copper. The cage may be formed from aluminum.

The system can include a chiller compressor connected to the AC electric motor. The fluid gap of the AC electric motor can be in fluid communication with a refrigerant of the chiller to cool the AC electric motor to thermally shunt the high frequency harmonics.

In accordance with at least one aspect of this disclosure, a method includes shunting high frequency harmonics to a fluid passing through a hermetic AC electric motor. The method can include providing AC electrical energy from an AC electric source directly to the AC electric motor without passing the AC electric energy through a filter. The AC electric energy can include the high frequency harmonics.

Shunting can include thermally shunting the high frequency harmonics by converting the high frequency harmonics to thermal energy in a structure that is configured to be in thermal communication with the fluid passing through the AC electric motor. In certain embodiments, the structure that is configured to be in thermal communication with the fluid passing through can be a cage on a rotor of the AC electric motor.

In some embodiments, the structure that is configured to be in thermal communication with the fluid passing through the AC electric motor is a shaft of a rotor of the AC electric motor. In some embodiments, the shunting includes converting the high frequency harmonics to thermal energy in an eddy current shield disposed between a shaft and a magnet of a rotor of the AC electric motor.

In accordance with at least one aspect of this disclosure, a hermetic AC electric motor system does not include a filter for removing high frequency harmonics.

In accordance with at least one aspect of the present disclosure, a hermetic AC electric motor includes harmonics shunting such that high frequency harmonics can be shunted from the AC electric motor without the use of one or more filters. The AC electric motor includes a stator, and a rotor disposed within the stator and in selective magnetic communication with the stator. A fluid gap is formed between the rotor and the stator and is configured to receive a cooling fluid.

The rotor includes a shaft, a plurality of longitudinal facets defined on the shaft, an eddy current shield disposed around the longitudinal facets, and a rotor element disposed on a longitudinal facet. The eddy current shield may be formed from copper. The rotor element can be a magnet or a spacer. The magnet may be a permanent magnet, and may be formed from neodymium and/or samarium cobalt. The spacer may be formed from non-magnetic material, such as aluminum or stainless steel. The rotor element includes a flat base surface dimensioned to mate with a longitudinal facet of the shaft and a curved top surface. The rotor element also includes two angled side surfaces configured to substantially or fully abut the side surfaces of a rotor element disposed on an adjacent longitudinal facet. In embodiments, the cooling fluid is a refrigerant. In embodiments, a sleeve, which may be formed from carbon fiber, is disposed around the rotor.

In accordance with at least one aspect of the present disclosure, a simplified variable speed drive system includes an AC electric source that outputs high frequency harmonics, and an AC electric motor including harmonics shunting such that the high frequency harmonics are shunted from the AC electric motor without the use of one or more filters. The AC electric motor of the system includes a stator, and a rotor disposed within the stator and in selective magnetic communication with the stator. A fluid gap exists between the rotor and the stator that is configured to receive a cooling fluid. The rotor includes a shaft, a plurality of longitudinal facets defined on the shaft, an eddy current shield disposed around the longitudinal facets, and a rotor element disposed on a longitudinal facet. The eddy current shield may be formed from copper. The rotor element can be a magnet or a spacer. The magnet may be a permanent magnet, and may be formed from neodymium and/or samarium cobalt. The spacer may be formed from non-magnetic material, such as aluminum or stainless steel. The rotor element includes a flat base surface dimensioned to mate with a longitudinal facet of the shaft and a curved top surface. The rotor element also includes two angled side surfaces configured to substantially or fully abut the side surfaces of a rotor element disposed on an adjacent longitudinal facet. In embodiments, the cooling fluid is a refrigerant. In embodiments, a sleeve, which may be formed from carbon fiber, is disposed around the rotor. In embodiments, the system includes a chiller compressor connected to the AC electric motor. In some embodiments, the fluid gap of the AC electric motor is in fluid communication with a refrigerant of the chiller compressor to cool the AC electric motor to thermally shunt the high frequency harmonics.

In accordance with at least one aspect of the present disclosure, a method of simplifying a variable speed drive system by shunting high frequency harmonics to a cooling fluid passing through an electric motor includes providing an electric motor configured to circulate a cooling fluid in communication with a rotor shaft having a plurality of magnets disposed therearound, providing an eddy current shield disposed between the rotor shaft and the plurality of magnets, and thermally shunting, through the eddy current shield, high frequency harmonics from the plurality of magnets to the rotor shaft.

In some embodiments, the method includes transferring heat from the rotor shaft to the cooling fluid. In some embodiments, the method includes providing a plurality of longitudinal facets defined on the rotor shaft to which at least one of the plurality of magnets is fixed. In some embodiments, the method includes mechanically securing the magnets to the shaft with a sleeve disposed around the rotor. In some embodiments, the method includes increasing thermal transfer from the plurality of magnets to the rotor shaft by increasing the surface area of the magnet-rotor interface.

BRIEF DESCRIPTION OF THE DRAWINGS

Various embodiments of the disclosed system and method are described herein with reference to the drawings wherein.

The various aspects of the present disclosure mentioned above are described in further detail with reference to the aforementioned figures and the following detailed description of exemplary embodiments.

DETAILED DESCRIPTION

Particular illustrative embodiments of the present disclosure are described hereinbelow with reference to the accompanying drawings, however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements which may perform the same, similar, or equivalent functions. The word "exemplary" is used herein to mean "serving as an example, instance, or illustration." Any embodiment described herein as "exemplary" is not necessarily to be construed as preferred or advantageous over other embodiments. The word "example" may be used interchangeably with the term "exemplary."

Certain portions of this disclosure may describe methods having various portions or steps. It should be appreciated that such portions and/or steps may be realized by any suitable hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices.

Embodiments as described herein include electric motors that can account for harmonics without using complicated and bulky filters by shunting the harmonics to a cooling fluid. These electric motors can be utilized in any suitable system (e.g., a chiller).

Figure 1:
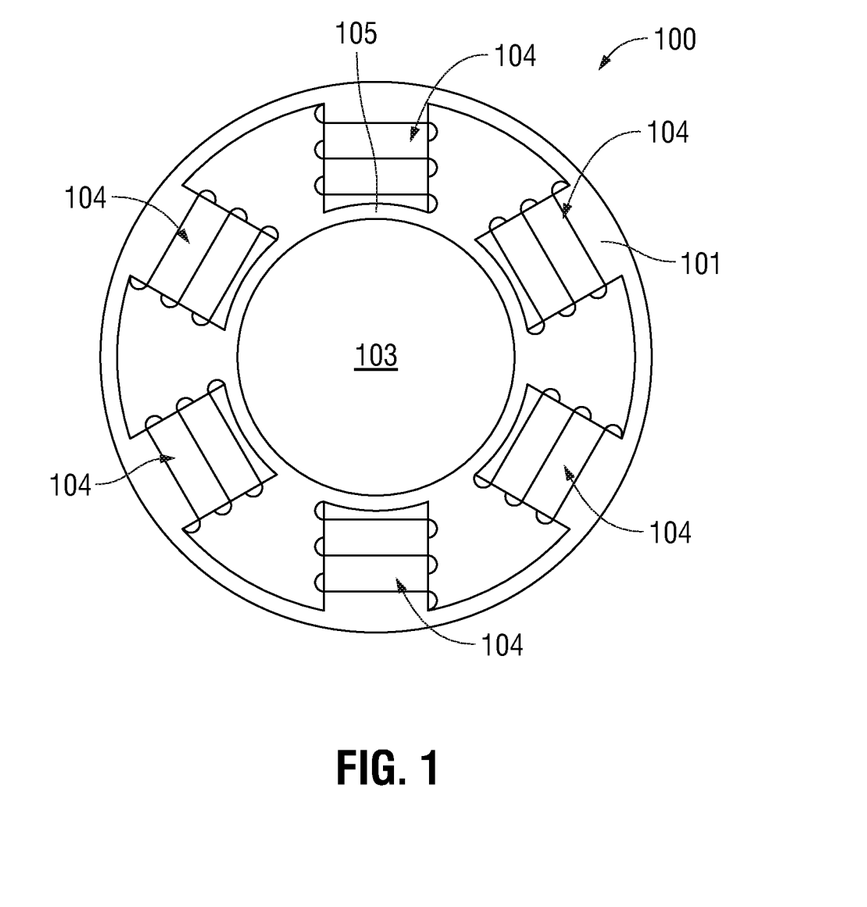
FIG. 1 is a cross-sectional view of an embodiment of a hermetic AC electric motor in accordance with the present disclosure.

Referring to FIG. 1, a hermetic AC electric motor 100 includes harmonics shunting such that high frequency harmonics can be shunted from the AC electric motor 100 without the use of one or more filters. While the embodiments described herein are referred to as a "motor," those having ordinary skill in the art will understand that the embodiments as described herein can also be used as a generator.

The motor 100 can include a stator 101 having a plurality of poles 104 and a rotor 103 disposed within the stator 101 that is in selective magnetic communication with the stator 101. The stator 101 can be configured to receive and/or output 3-phase current.

A fluid gap 105 exists between the rotor 103 and the stator 101. The fluid gap 105 is configured to receive a cooling fluid and can include any suitable size. The fluid gap can be the space between the rotor outside diameter and the inside surface of the stator bore. The inside surface of the stator bore can be made up of the combination of the stator lamination teeth and slot wedges. In certain embodiments, the gap 105 between the rotor outside diameter and a stator lamination tooth can be about 0.05 inches to about 0.15 inches. Gaps between the rotor outside diameter and slot wedges can be on the order of about 0.05 inches to about 0.3 inches.

The motor 100 is cooled by a cooling fluid (e.g., refrigerant gas or liquid) that is fed radially and/or axially through the stator core and through the gap 105. The gap 105 can receive flow from other system locations (e.g., an evaporator, economizer, or condenser of a chiller system 400 as described below). The cooling fluid is directed through the motor stator 101 and/or rotor 103, and is returned to the system location (e.g., evaporator, economizer, condenser). The fluid removes Joule losses associated with high frequency currents at a rate sufficient to ensure reliable component operation without need for inductive, capacitive, or other conventional filters between the variable speed motor controller 303 and the motor 100.

Figure 2A:
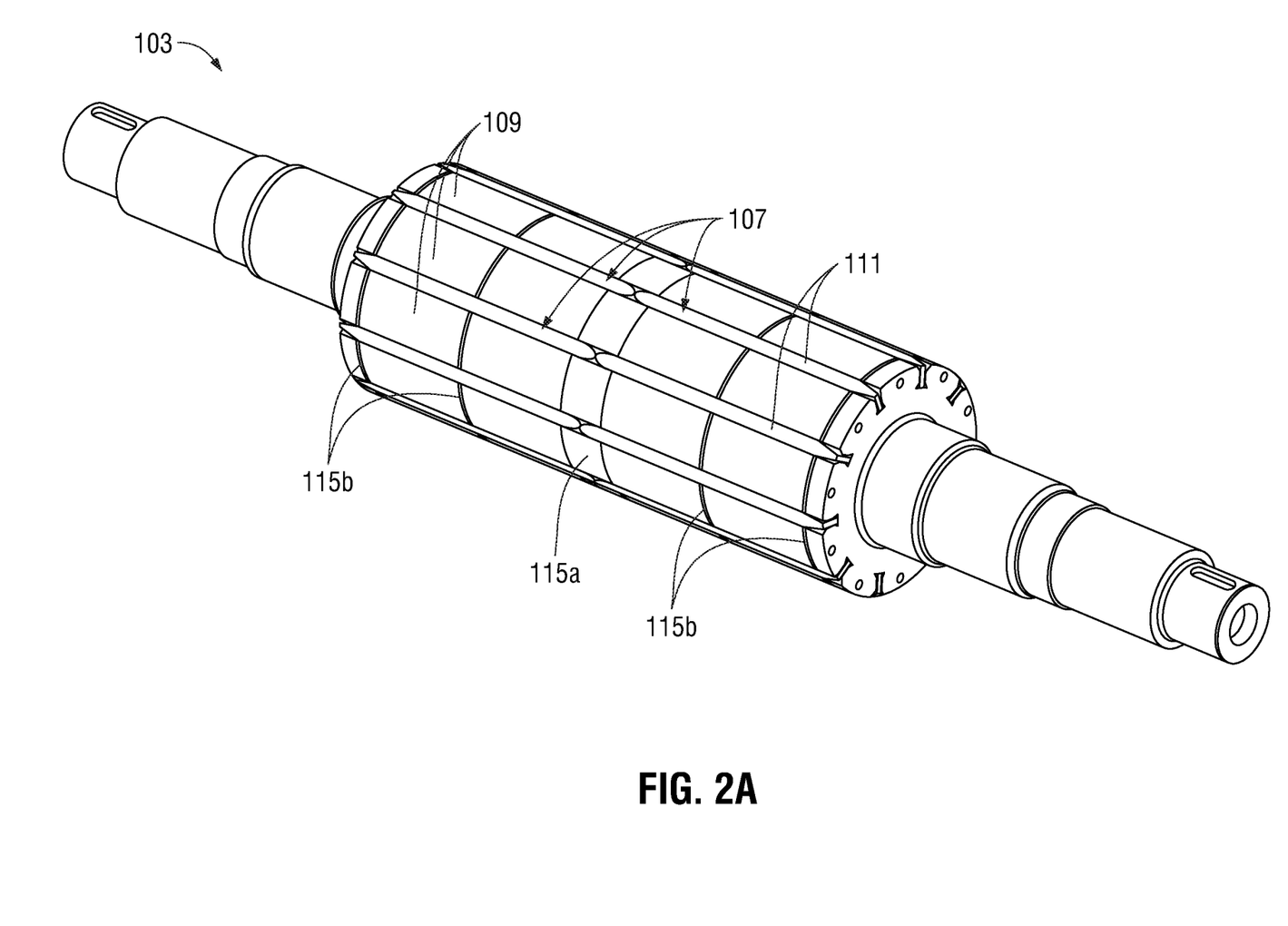
FIG. 2A is a perspective view of an embodiment of a rotor in accordance with the present disclosure.

Referring to FIG. 2A, the rotor 103 can include a cage 107 disposed on the rotor 103 configured to receive high frequency harmonics and shunt the high frequency harmonics to the cooling fluid. For example, one or more portions of the cage 107 can be selected for material and/or shape to receive the high frequency harmonic electromagnetic energy from the stator 101 and dissipate the energy to the cooling fluid.

Referring additionally to FIGS. 2B-2E, the rotor 103 can include surface permanent magnets 109. The surface permanent magnets 109 can be disposed in any suitable order with respect to polarity (e.g., a positive side of the rotor 103 and a negative side of the rotor 103).

The cage 107 can also include a plurality of aluminum wedges 111. Each wedge 111 can be disposed between each surface permanent magnet 109. The aluminum wedges 111 can include any suitable shape to optimize conversion of high frequency harmonics to thermal energy through Joule heating, for example. Any other suitable portion of the rotor 103 and or stator 101 can have any suitable shape to facilitate conversion of high frequency harmonics to thermal energy to be cooled by refrigerant or other suitable cooling liquid in the fluid gap.

One or more pole gap fillers 113 can also be disposed on the rotor 103. The pole gap filler 113 can be any suitable material (e.g., stainless steel). While 2-pole systems are described herein, any suitable number of poles is contemplated herein, e.g. a positive side of the rotor and a negative side of the rotor arranged in magnetic pole pairs about the circumference of the rotor.

In certain embodiments, the cage 107 can include one or more aluminum spacers disposed around the rotor 103. As shown, in certain embodiments, the one or more aluminum spacers can include a thick spacer 115a and two thin spacers 115b disposed axially away from the thick spacer 115a on opposite sides of the thick spacer 115a. Any other suitable configuration, position, and/or size for the spacers is contemplated herein.

Figure 2B:
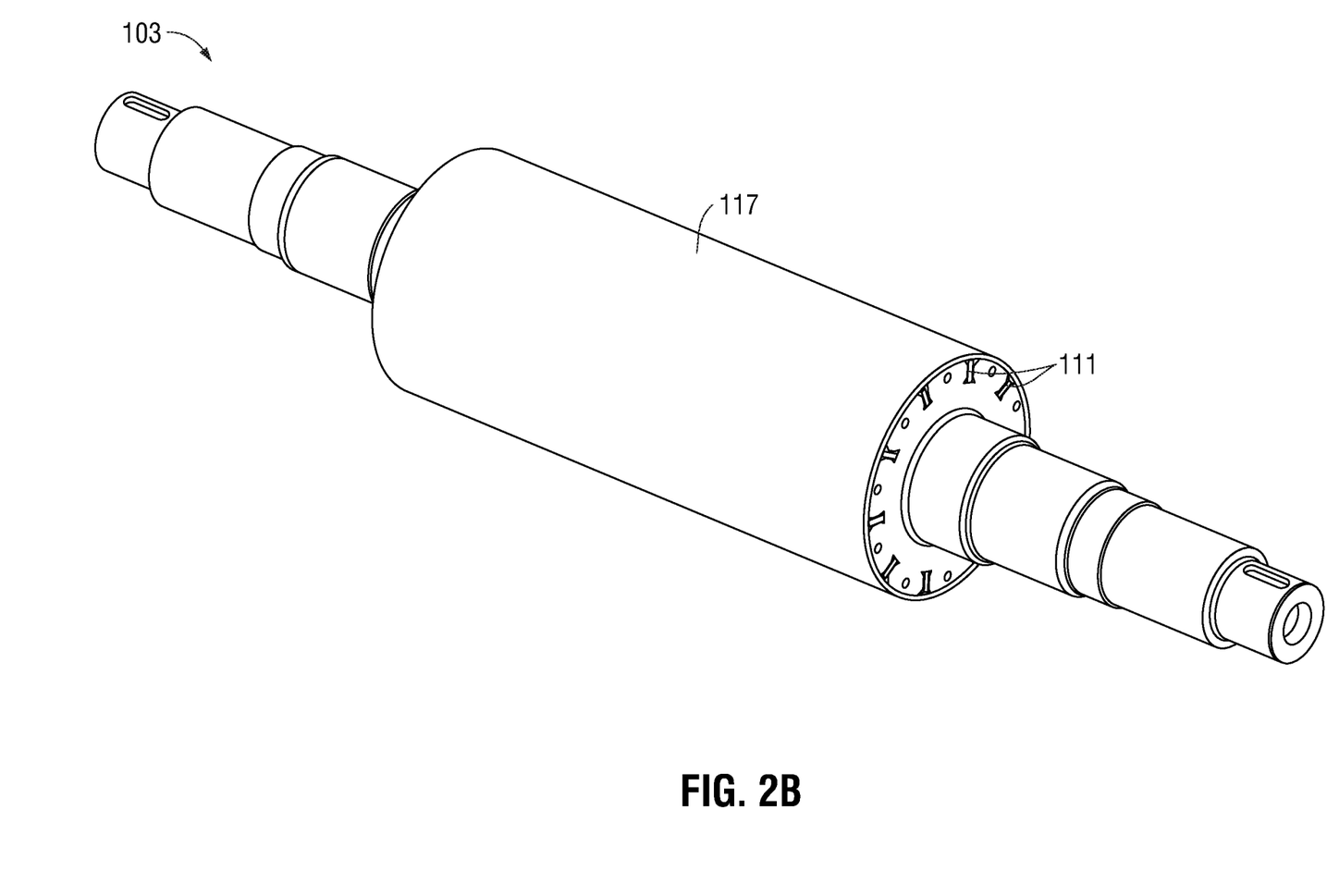
FIG. 2B is a perspective view of the rotor of FIG. 2A, shown with a sleeve disposed thereon.
Figure 2C:
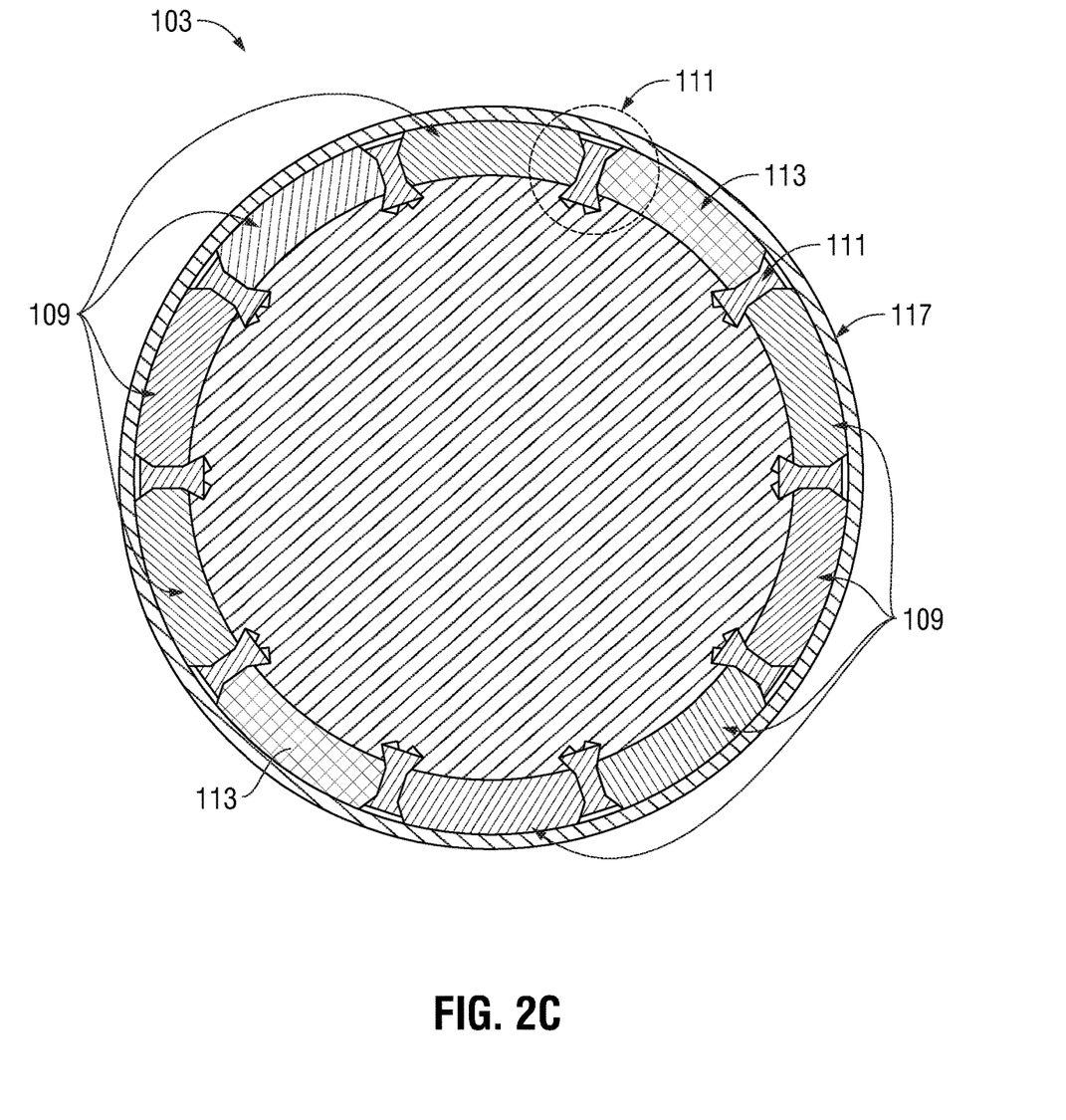
FIG. 2C is a cross-sectional view of the rotor of FIG. 2A.
Figure 2D:
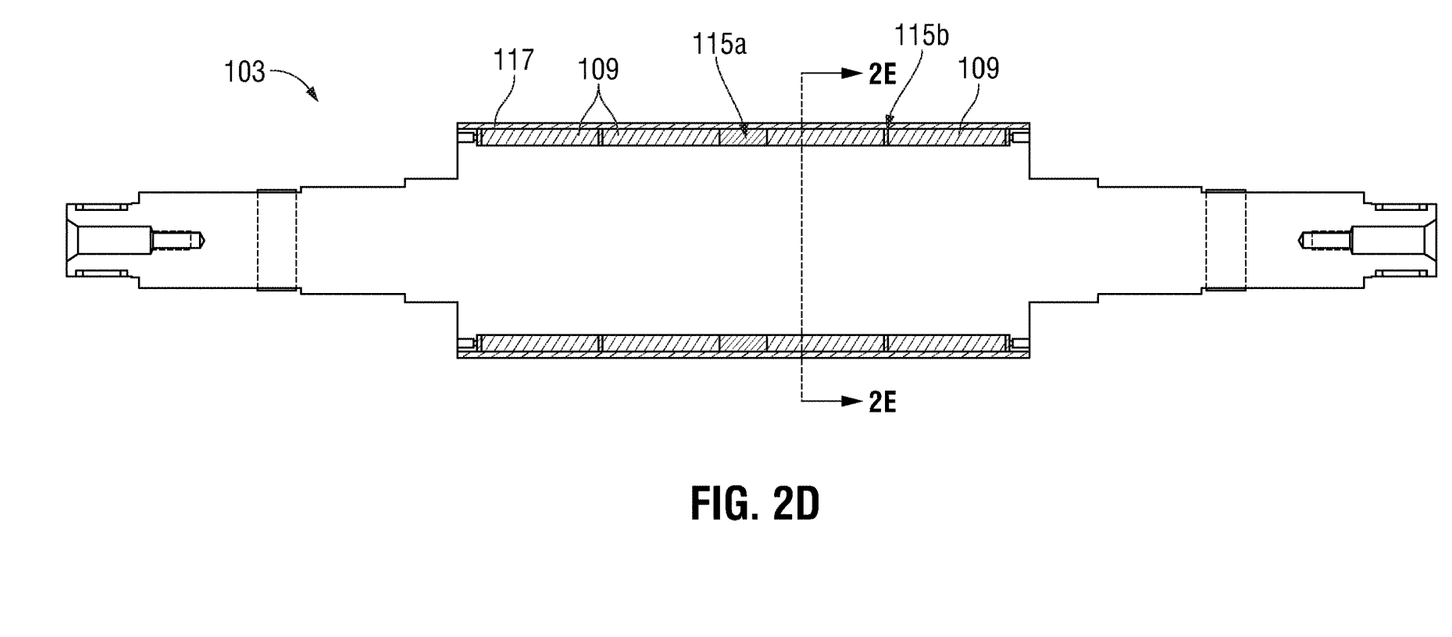
FIG. 2D is a longitudinal cross-sectional view of the rotor of FIG. 2A.
Figure 2E:
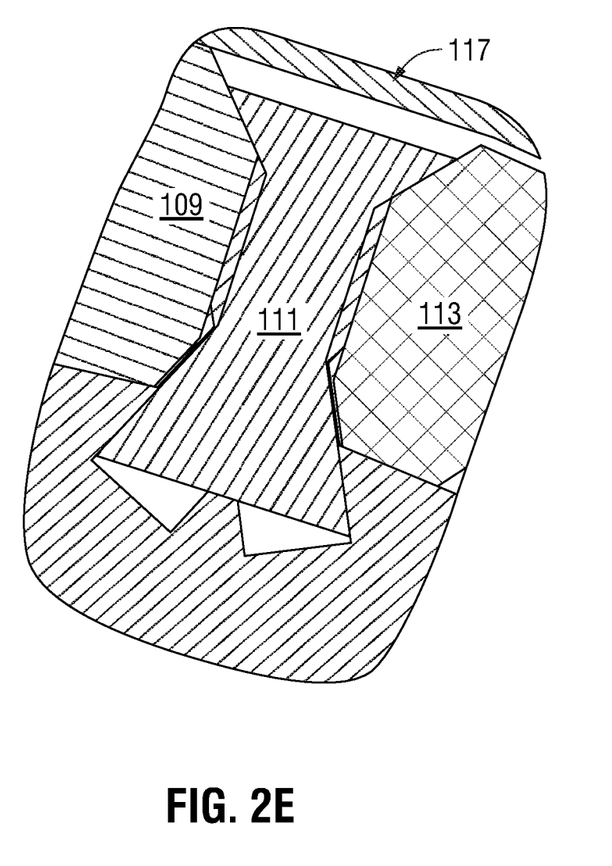
FIG. 2E is an enlarged view of a portion of a cage of the rotor of FIG. 2A.

In certain embodiments, the rotor 103 can further include a sleeve 117 disposed around the rotor 103 and the cage 107. The sleeve 117 may be the same length as the cage 107, or any other suitable size. In embodiments, sleeve 117 may be formed from carbon fiber composite material. In embodiments, sleeve 117 may be formed from inconel.

Figure 3:
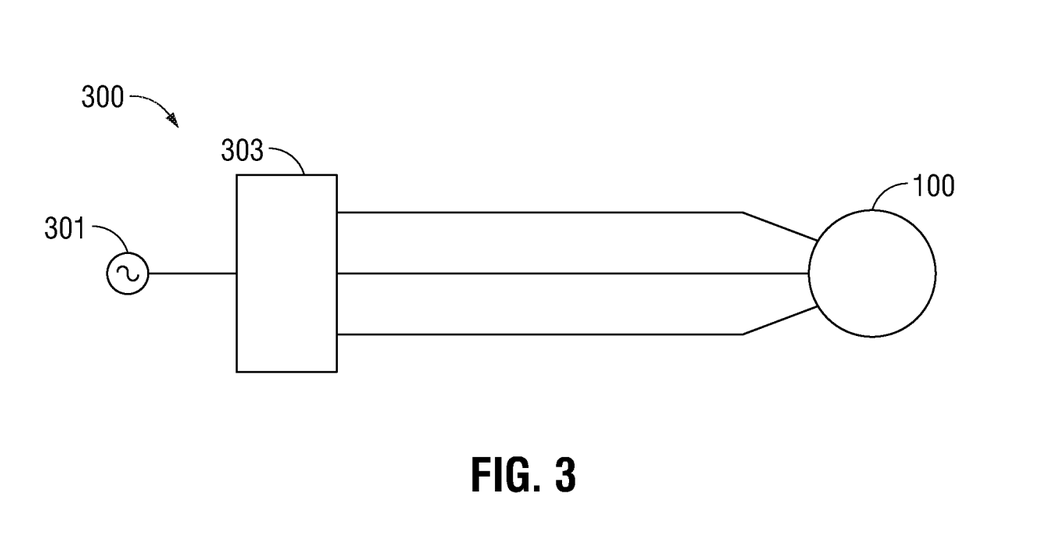
FIG. 3 is a schematic view of an embodiment of a system in accordance with the present disclosure.

Referring to FIG. 3, a system 300 includes an AC electric source 301 that outputs high frequency harmonics. The system 300 also includes a hermetic AC electric motor 100 as described above connected to the AC electric source 301 without one or more filters. As shown, the AC electric motor 100 can be connected to the AC power source 301 through a motor controller 303 (e.g., which controls 3-phase power output to the stator 101).

Motor 100 and/or system 300 can be utilized in any suitable system. For example, the motor 100 and/or system 300 can be included in a chiller system and/or other suitable compressor system for climate control. An embodiment of a chiller system is shown in FIG. 4.

The motor 100 (or any other suitable motor design) is shown attached to the compressor to turn the compressor which compresses a refrigerant in the refrigerant loop 401. The chiller system 400 includes a condenser, an evaporator, and an expansion valve as appreciated by those having ordinary skill in the art.

The condenser can thermally communicate with water from a cooling tower which condenses the refrigerant in the refrigerant loop 401. The evaporator is in fluid thermal communication with water in another water loop 402 to cool the water. The water circulates to cool a structure as appreciated by those having ordinary skill in the art (e.g., through one or more air handling units), for example.

Figure 4:
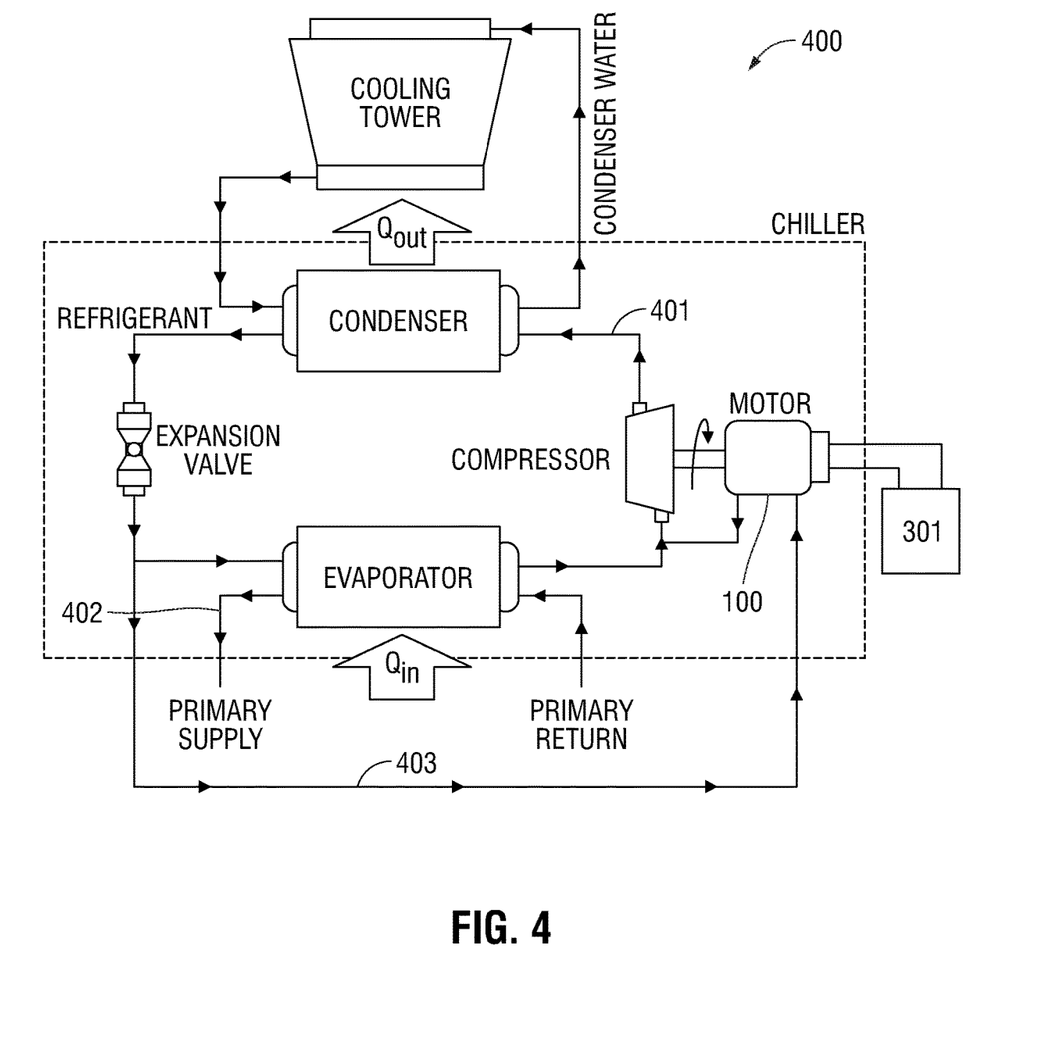
FIG. 4 is a schematic view of an embodiment of a chiller system in accordance with the present disclosure.

As shown in FIG. 4, the refrigerant loop 401 can include a motor branch 403 that circulates refrigerant to the motor 100 through the fluid gap 105 to remove heat generated by the high frequency harmonics. As shown, in certain embodiments, the motor branch 403 can have its inlet located downstream of the expansion valve to receive cooled refrigerant. The outlet after passing through the motor 100 can be located downstream of the evaporator, in certain embodiments. It is contemplated that any other suitable location for the inlet and outlet of the motor branch 403 can be utilized as will be appreciated by the skilled artisan. Also, it is contemplated that any other suitable cooling fluid and/or circuit (e.g., water in water loop 402, water from the cooling tower) can be routed through the motor 100 in addition to (via a fluidly isolated circuit) or alternative of the refrigerant in refrigerant loop 401).

In accordance with at least one aspect of this disclosure, a method includes shunting high frequency harmonics to a fluid passing through a hermetic AC electric motor 100. The method can include providing AC electrical energy from an AC electric source 301 to the AC electric motor 100 without passing the AC electric energy through a filter.

Shunting can include thermally shunting the high frequency harmonics by converting the high frequency harmonics to thermal energy in a structure that is configured to be in thermal communication with the fluid (e.g., a refrigerant of a chiller) passing through the AC electric motor 100. The structure that is configured to be in thermal communication with the fluid passing through can be a cage 107 on a rotor of the AC electric motor 100, for example.

High frequency currents are associated with harmonics of the drive switching frequencies. Drive switching frequencies are typically 10 times the motor electrical frequencies (corresponding to, for example, the number of poles×motor RPM/120). These switching frequencies reside in the stator but induce current on the rotor. With surface permanent magnet rotors, eddy currents are induced on the permanent magnet surfaces. In permanent magnet construction with aluminum bars as described above, the high frequency currents in the stator induce currents in the aluminum. Joule heating is the principle by which high frequency currents are converted into thermal energy, e.g., heating of the aluminum. This, in turn, shunts the energy away from the magnets. Removal of the energy from the aluminum bars is accomplished with refrigerant cooling, as described above, through conductive and/or convective heat transfer.

Figure 5:
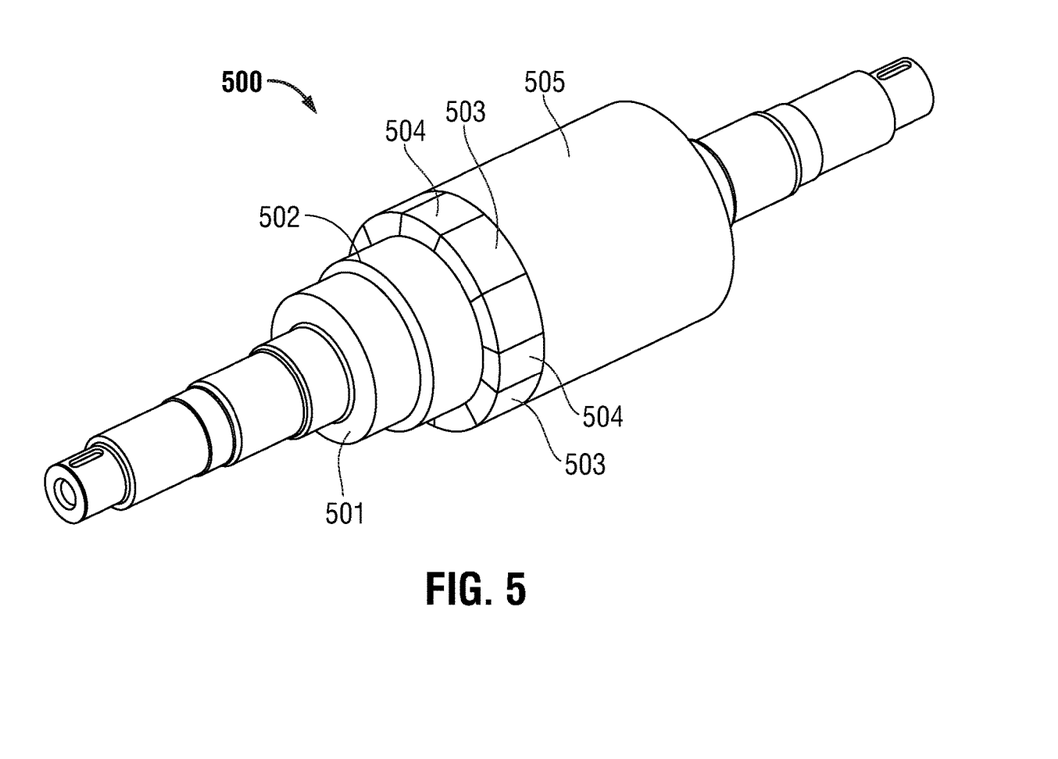
FIG. 5 is a cutaway, perspective view of a rotor having a harmonic shunting shield in accordance with another embodiment of the present disclosure.

Shunting of thermal energy from the magnets may alternatively be achieved through the use of a shield that shunts the high frequency currents to the shaft. As shown in FIG. 5, a hermetic AC electric motor in accordance with the present disclosure includes a harmonic-shunting rotor 500 having a steel shaft 501 that includes an eddy current shield 502 disposed coaxially therearound. Shield 502 can be formed from any suitable material such as aluminum or copper to receive the high frequency harmonic electromagnetic energy from rotor magnets 503 though joule heating as described above and dissipate thermal energy to shaft 501. Preferably, eddy shield 502 is deposited onto shaft 501 using a thermal spray technique in which molten coating material, such as copper or aluminum, is atomized and sprayed onto a substrate, e.g., shaft 501. Suitable thermal spray techniques include, without limitation, electric arc spray (twin wire electric arc), flame spray (oxy-acetylene), plasma spray (APS), and high velocity oxy-fuel (HVOF). In an alternative embodiment, eddy shield 502 may be deposited onto shaft 501 using electroplating. In yet another embodiment, eddy shield 502 may be formed from wire that is wrapped onto shaft 501. Rotor 500 may include one or more non-magnetic spacers 504 disposed between any two or more magnets 503.

Shaft 502 is configured to be in thermal communication with a cooling fluid to dissipate heat into the cooling fluid. Shaft 502 may additionally or alternatively be configured to dissipate heat into the ambient environment. Rotor 500 includes an outer sleeve 505 to protect the assembly and to mechanically secure aforementioned components of rotor 500 in place. In some embodiments, sleeve 505 is formed from carbon fiber. In some embodiments, sleeve 505 is formed from inconel. Thus, rotor 500 includes, from outside to inside, outer sleeve 505, magnets 503 and/or spacers 504, eddy shield 502, and shaft 501.

Figure 6:
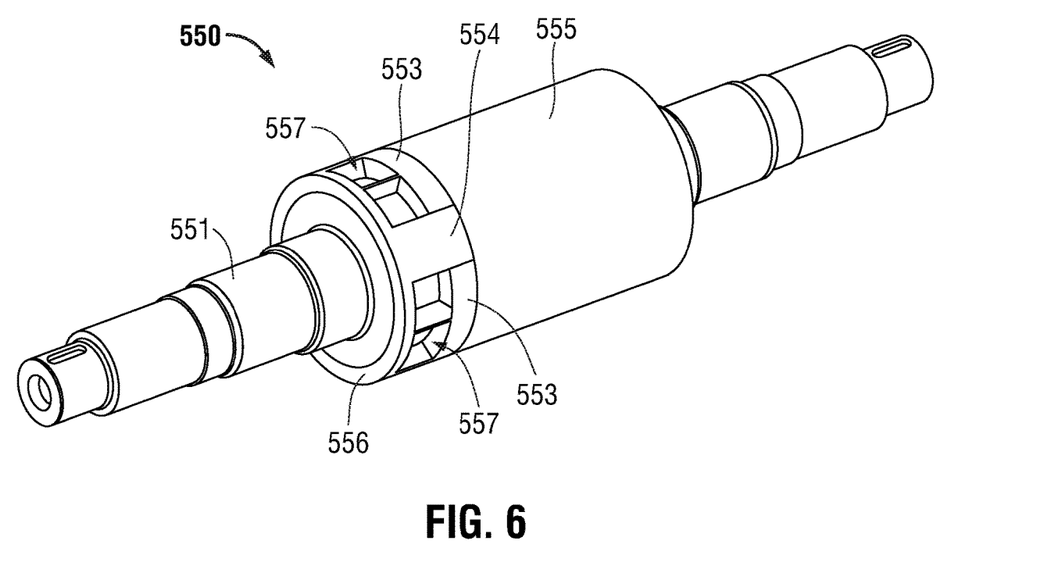
FIG. 6 is a cutaway, perspective view of a rotor having a cage construction in accordance with another embodiment of the present disclosure.

FIG. 6 illustrates another embodiment of a harmonic-shunting rotor 550 of a hermetic AC electric motor in accordance with the present disclosure. Rotor 550 includes a cage 556 disposed around shaft 551. Cage 556 includes a plurality of supports 554 and pockets 557 that are dimensioned to retain magnets 553 to rotor 550. Cage 556 is preferably formed from aluminum to decrease rotational mass and manufacturing cost, however any suitable material, including copper, may be used.

Rotor 550 may be manufactured by machining pockets 557 into an aluminum tube to form cage 556, pressing cage 556 onto shaft 551, and installing magnets 553 into pockets 557. In another embodiment, cage 556 may be manufactured from cylindrical stock by first machining a bore therethrough and proceeding as described above. Magnets 553 are secured in pockets 557 using adhesive and/or press fit. Outer sleeve 555 is fixed to rotor 550 to further secure magnets 553 in place and to provide a protective barrier. Outer sleeve 555 may be formed from any suitable material as described herein, such as, without limitation, carbon fiber resin, inconel, and the like.

In another method of manufacture, rotor 550 is formed by casting an aluminum sleeve onto steel shaft 551, machining pockets 557 into the aluminum sleeve to form cage 556, and installing magnets 553 into pockets 507.

Figure 7A:
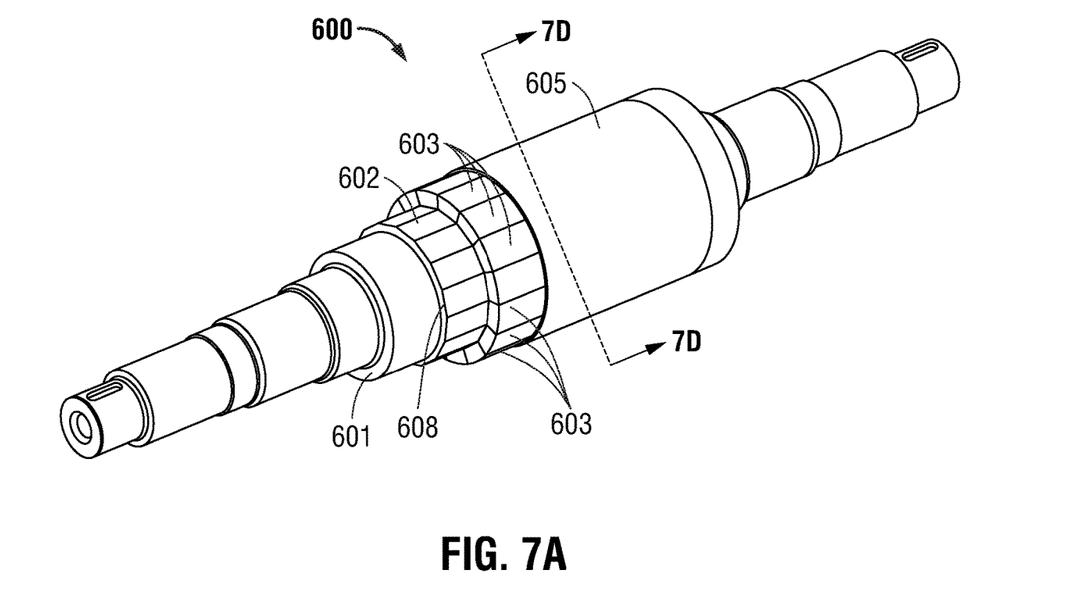
FIG. 7A is a cutaway, perspective view of another embodiment of a rotor in accordance with the present disclosure.
Figure 7B:
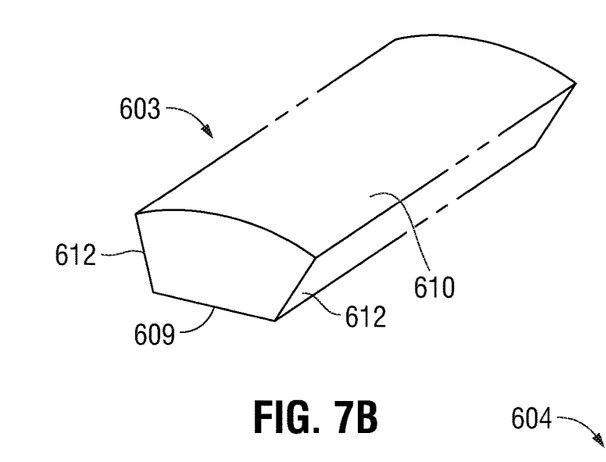
FIG. 7B is a perspective view showing a magnet of the rotor of FIG. 7A.
Figure 7C:
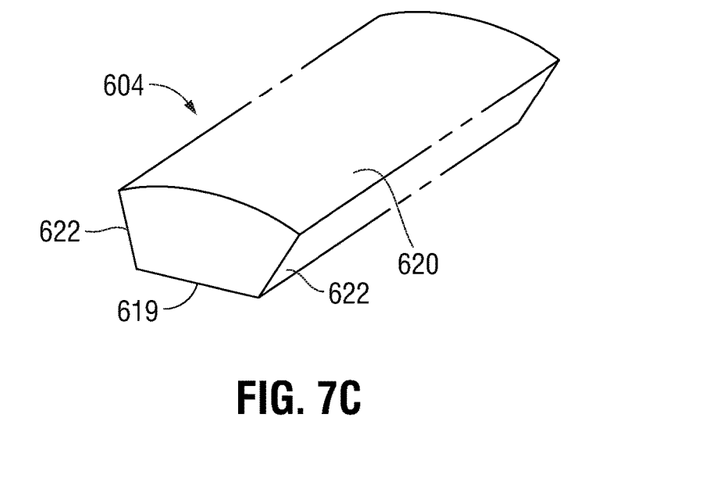
FIG. 7C is a perspective view showing a spacer of the rotor of FIG. 7A.
Figure 7D:
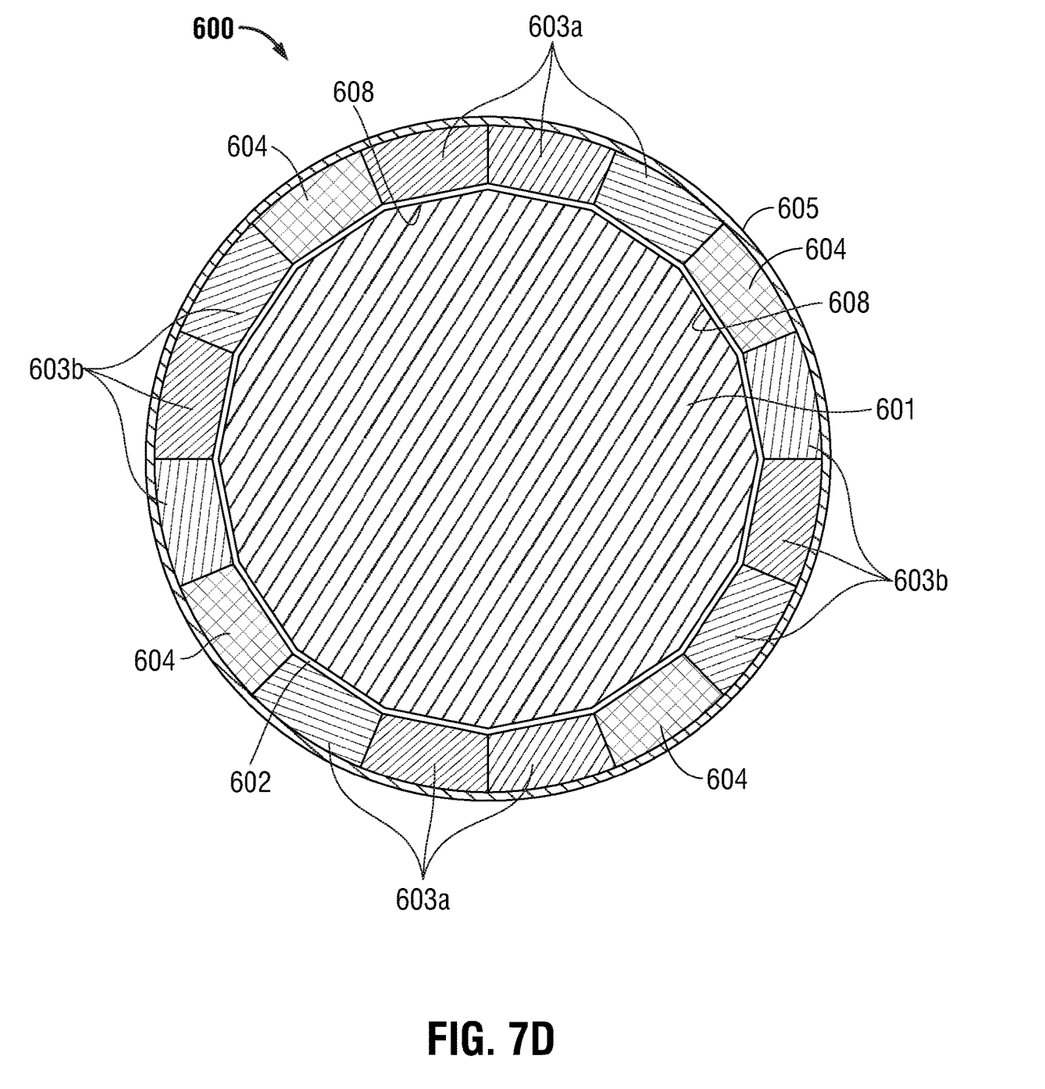
FIG. 7D is a cross-sectional view of the rotor of FIG. 7A.

In an embodiment illustrated in FIGS. 7A-D, a hermetic AC electric motor in accordance with the present disclosure includes a harmonic-shunting rotor 600 having a shaft 601 on which there is defined thereon a plurality of longitudinal facets 608. Eddy shield 602 is deposited onto the plurality of longitudinal facets 608 to thermally shunt high frequency harmonics from magnets 603 to shaft 601 as described above. Each facet 608 provides a flat mounting surface onto which a rotor member, such as a magnet 603 or a spacer 604, is affixed. As seen in FIG. 7B, magnet 603 has a nominal bread loaf shape that includes a flat base surface 609 dimensioned to mate with a corresponding facet 608 of shaft 601, two angled side surfaces 612, and a curved top surface 610. As best illustrated in FIG. 7D, magnets 603 can be arranged around shaft 601 in alternating polarity groups, e.g., two groups of three magnets 603a having a positive polarity field and two groups of three magnets 603b having a negative polarity field. In the exemplary embodiment shown, magnet 603 is a permanent magnet. In embodiments, magnet 603 may be formed from neodymium and/or samarium cobalt.

One or more magnets 603 may be separated by a spacer 604 that is similarly-shaped to magnet 603 yet formed from a non-magnetic material, such as, without limitation, aluminum or stainless steel. In some embodiments, spacer 604 may be formed from unmagnetized (inert) magnetic material, such as unmagnetized neodymium or unmagnetized samarium cobalt. In the present embodiment, each polarity group is separated by a spacer 604. Spacer 604 has a nominal bread loaf shape that includes a flat base surface 619 dimensioned to mate with a corresponding facet 608 of shaft 601, two angled side surfaces 622, and a curved top surface 620.

Collectively, the curved top surfaces of magnets 603 and/or spacers 604 define an outer circumference of rotor 600 onto which outer sleeve 605 is fixed. The side surfaces of magnet 603 and spacers 604 are angled to abut the side surfaces of an adjacent magnet 603 or spacer 604 on either side. The disclosed combination of radially-abutting, flat-based magnets 603 and/or spacers 604 fixed to faceted mounting surfaces 608 and enclosed within outer sleeve 605 forms an extremely rigid and stable rotor assembly that provides maximum torque transmission from magnets 603 to shaft 601. Advantageously, because magnet 603 requires only a single curved top surface, in contrast to designs which require both top and bottom magnet surfaces to be curved, magnet 603 is simpler to fabricate and thus manufacturing costs may be decreased. Ease of manufacture may improve due to the inherent self-aligning nature of the faceted design. Thermal transfer from magnets 603 to shaft 601 may also be improved due to the increased surface area of the disclosed faceted magnet-shaft interface as compared to a cylindrical magnet-shaft interface. It is to be understood that, while the exemplary embodiment depicted in FIGS. 7A-D includes sixteen facets 608 supporting twelve magnets 603 and four spacers 604, the present disclosure is not so limited. Embodiments of the present disclosure may include a number of facets other than sixteen, and may include a different number of magnets and/or spacers than illustrated, which can be arranged in any combination.

As described above, embodiments include a chiller that incorporates, e.g., compressors (e.g., centrifugal, screw, or scroll compressors) with either induction or permanent magnet motors. The motors can include surface permanent magnet rotors with aluminum cages surrounding the magnets, stators with axial coolant channels and/or radially fed gas cooled air. As described above, embodiments include the application of high speed motor topologies along with variable speed drives on centrifugal chillers or other suitable systems without the need for expensive filters between the motor 100 and the variable speed motor controller 303.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. A hermetic AC electric motor comprising harmonics shunting such that high frequency harmonics can be shunted from the AC electric motor without the use of one or more filters, comprising:
   a stator;
   a rotor disposed within the stator and in selective magnetic communication with the stator, wherein a fluid gap exists between the rotor and the stator, and wherein the fluid gap is configured to receive a cooling fluid, the rotor comprising:
      a shaft;
      a plurality of longitudinal facets defined on the shaft, wherein a facet, of the plurality of longitudinal facets, has a top surface that is flat;
      an eddy current shield lining the facet; and
      a rotor element disposed in the facet, wherein the rotor element has a bottom surface that is flat and configured to mate with the top surface of the facet and two angled side surfaces configured to abut side surfaces of adjacent rotor elements disposed in adjacent facets of the plurality of longitudinal facets.

2. The motor in accordance with claim 1, wherein the rotor element is selected from the group consisting of a magnet and a spacer.

3. The motor in accordance with claim 2, wherein the magnet is a permanent magnet.

4. The motor in accordance with claim 2, wherein the spacer is formed from non-magnetic material.

5. The motor in accordance with claim 1, wherein the rotor element that has the bottom surface that is flat further has a top surface that is curved.

6. The motor in accordance with claim 1, wherein the cooling fluid is a refrigerant.

7. The motor in accordance with claim 1, further comprising a sleeve disposed around the rotor.

8. The motor in accordance with claim 7, wherein the sleeve is formed from carbon fiber.

9. The motor in accordance with claim 1, wherein the eddy current shield is formed from copper.

10. A simplified variable speed drive system, comprising:
    an AC electric source that outputs high frequency harmonics; and
    an AC electric motor including harmonics shunting such that the high frequency harmonics are shunted from the AC electric motor without the use of one or more filters, comprising:
       a stator;
       a rotor disposed within the stator and in selective magnetic communication with the stator, wherein a fluid gap exists between the rotor and the stator,
    wherein the fluid gap is configured to receive a cooling fluid, comprising:
       a shaft;
       a plurality of longitudinal facets defined on the shaft, wherein a facet, of the plurality of longitudinal facets, has a planar top surface;
       an eddy current shield disposed around the facet;
       a rotor element disposed on the facet, wherein the rotor element has a planar bottom surface configured to mate with the planar top surface of the facet and two angled side surfaces configured to abut side surfaces of adjacent rotor elements disposed on adjacent facets of the plurality of longitudinal facets.

11. The simplified variable speed drive system in accordance with claim 10, wherein the rotor element is selected from the group consisting of a magnet and a spacer.

12. The simplified variable speed drive system in accordance with claim 11, wherein the magnet is a permanent magnet.

13. The simplified variable speed drive system in accordance with claim 11, wherein the spacer is formed from non-magnetic material.

14. The simplified variable speed drive system in accordance with claim 10, wherein the rotor element that has the planar bottom surface further has an arced top surface.

15. The simplified variable speed drive system in accordance with claim 10, wherein the cooling fluid is a refrigerant.

16. The simplified variable speed drive system in accordance with claim 10, further comprising a sleeve disposed around the rotor.

17. The simplified variable speed drive system in accordance with claim 16, wherein the sleeve is formed from carbon fiber.

18. The simplified variable speed drive system in accordance with claim 10, wherein the eddy current shield is formed from copper.

19. The simplified variable speed drive system in accordance with claim 10, further comprising a chiller compressor connected to the AC electric motor.

20. The simplified variable speed drive system in accordance with claim 19, wherein the fluid gap of the AC electric motor is in fluid communication with a refrigerant of the chiller compressor to cool the AC electric motor to thermally shunt the high frequency harmonics.

21. A method of simplifying a variable speed drive system by shunting high frequency harmonics to a cooling fluid passing through an electric motor, comprising:
   providing an electric motor configured to circulate a cooling fluid in communication with a rotor shaft having a plurality of magnets disposed therearound;
   providing an eddy current shield disposed between the rotor shaft and the plurality of magnets;
   thermally shunting, through the eddy current shield, high frequency harmonics from the plurality of magnets to the rotor shaft; and
   providing a plurality of longitudinal facets defined on the rotor shaft to which at least one of the plurality of magnets is fixed, wherein the plurality of longitudinal facets have flat upper surfaces configured to receive flat bottom surfaces of the plurality of magnets and two angled side surfaces configured to abut side surfaces of adjacent rotor elements disposed in adjacent facets of the plurality of longitudinal facets.

22. The method in accordance with claim 21, further comprising transferring heat from the rotor shaft to the cooling fluid.

23. The method in accordance with claim 21, further comprising mechanically securing the magnets to the shaft with a sleeve disposed around the rotor.

24. The method in accordance with claim 21, further comprising increasing thermal transfer from the plurality of magnets to the rotor shaft by increasing the surface area of the magnet-rotor interface.

* * * * *